Nov. 17, 1959  F. L. DAVIS  2,913,216
VARIABLE CARGO TIE-DOWN EQUIPMENT
Filed Aug. 27, 1957
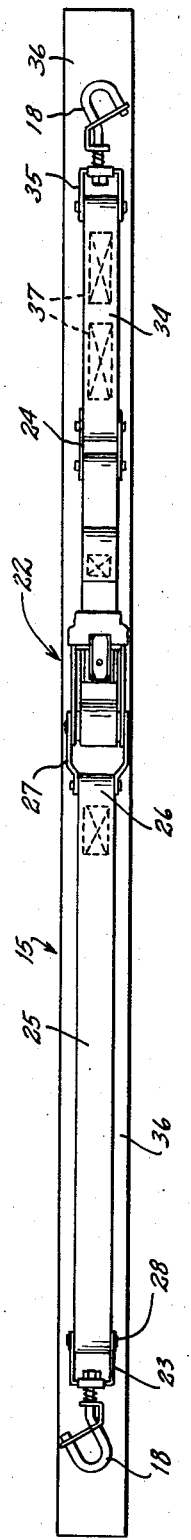
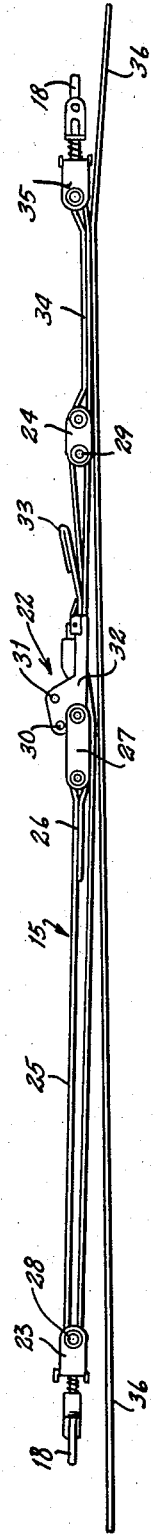
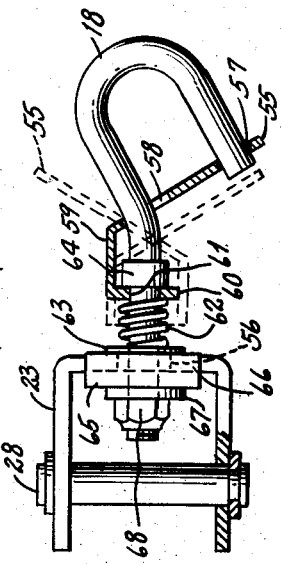
INVENTOR.
FRANK L. DAVIS
BY
ATTORNEY

United States Patent Office 2,913,216
Patented Nov. 17, 1959

2,913,216

VARIABLE CARGO TIE-DOWN EQUIPMENT

Frank Louis Davis, College Point, N.Y.

Application August 27, 1957, Serial No. 680,528

2 Claims. (Cl. 248—361)

The invention herein disclosed relates to tie-down equipment, particularly for heavy, miscellaneous cargo such as ammunition, missiles and the like.

Special objects of the invention are to provide such equipment in a form which can be quickly varied one way or another to suit different cargo as to size, shape, weight, location and surroundings and which, in all various combinations, will hold the load fast, with safety and security.

The invention is concerned with the securing of all kinds of cargo on all kinds of conveyances, on shipboard, railway cars, aircraft and the like, and it is accordingly a purpose of the invention to provide the equipment in units which will be suited to the conditions existing on such carriers.

Special objects of the invention are to provide such equipment in strong, lightweight form, flexible to meet all requirements, reasonable in cost and of such a nature as to firmly hold and confine without deforming or injuring the confined object or objects.

The foregoing and other desirable objects are attained by novel features of construction, combinations and relations of parts as hereinafter set forth in the following specification and defined in the claims.

The drawing accompanying and forming part of the specification illustrates a present commercial embodiment of the invention, but it will be appreciated that structure and arrangement may be modified and changed within the true spirit and scope of the invention as hereinafter defined and claimed.

Figs. 1 and 2 are top plan and edge views, respectively, of the adjustment assembly unit.

Fig. 3 is an enlarged broken, part sectional view of the safety hook used in the adjustment assembly.

The adjustment assembly unit 15, of this invention, is shown as having terminal hooks 18, at opposite ends adapted for engagement with deck or floor rings or other forms of anchorage connections.

The adjustment assembly is shown in Figs. 1 and 2 as made up with take-up buckles 22 like those disclosed in Fig. 8 of copending patent application Serial No. 493,956 filed March 14, 1955, Patent 2,867,406, issued January 6, 1959, which can be shifted to different positions between end shackles 23, 24 to locate it at the most convenient or available position between the end fittings.

This is accomplished by having the webbing 25 of the unit made fast at one end at 26 to the buckle frame 27 and looped about a pin or roller 28 of the end shackle 23 and extended back through the buckle, around a pin or roller 29 in the other end shackle 24 back to the buckle where it is extended about pins or rollers 30, 31 on the slack take-up lever 32 and brought out through the buckle with a pull grip 33.

The terminal shackle 24, is shown as connected by doubled length of webbing 34 with the shackle 35 carrying the hook 18 at that end of the assembly.

A special feature of this adjustment assembly is that it carries a strip or pad of webbing 36 stitched or otherwise secured at 37 to the anchorage loop 34.

This web pad 36 underlies the extensible and contractable length of webbing 25 and the take-up buckle 22, providing for smooth, easy action of these parts and preventing injury or deformation of the load held by the assembly.

The tie-down unit may be used direct or over cargo blankets, tarpaulins, or other forms of covers.

The take-up buckles 22 of the adjustment unit is used to effect necessary tightening and slack take-up of the unit.

The adjoining ends of two adjustment units may be hooked down to the same floor bolt in the nature of a hold-down sling.

For security and self-alignment purposes, the end hooks 18 on the several units may be constructed as shown in Fig. 3, with a guard plate 55 engageable over the bill of the hook and the shank of the hook extended through an oversize opening 56 in the end of the shackle 23 enabling the hook to swivel and rock on the shackle.

The guard 55 is shown as a one-piece plate having an end perforation 57 to pass over the end of the hook and an oversize opening 58 for the shank and base portion of the hook, this plate having an extension 59 terminating in an angularly bent lug 60 having an opening 61 slidingly engaged over the shank of the hook.

A spring 62 interposed between the base lug 60 and a washer 63 in engagement with the end of the shackle forces lug 60 into abutment with a collar or shoulder 64 on the shank and serves thus to hold the guard in engagement over the end of the hook, as in full lines, Fig. 3.

The guard, however, may be forced back or downward over the shank against the tension of the spring into the dotted line position shown in Fig. 3, and free of the end of the hook whereupon it may be rotated about the shank to the far or back side of the hook where it will then be held in the open position leaving the hook clear for quick engagement with any other object. It will be noted that the oversize hole 58 in the guard plate permits these retracting and rotative movements of the guard plate about the shank.

The spring 62 serves the further purpose of permitting the hook to rock one way or another in the oversize opening 56 in the shackle and serves to restore the hook to the straight line position as shown in Fig. 3, when relieved of offsetting tendencies.

As a further aid to centering the hook on the shackle, a U-shaped or flanged clip 65 is shown engaged on the shank over the inner face of the shackle with its flanged ends 66 engaged over the edge of the shackle, this clip being backed up by a washer 67 and abutment nut 68 on the inner end of the shank.

These end hooks because of construction described, will carry side loads as well as direct tension without danger of coming loose. They are light in weight and strong, occupy small space and so may be used safely and equally well in close or crowded quarters.

The invention disclosed provides a practically universal form of tie-down for all kinds of cargo, which can be readily applied and secured and any slack quickly taken up at any time. If the need develops, the tension may be immediately released by opening the levers 32 of the slack take-up buckles. When so released, these buckles may be shifted one way or the other over the underlying pads 36 to locate them in different, possibly more accessible locations for tightening down and taking up slack.

With all the advantages, the construction of the units is relatively simple and inexpensive.

These units may be used singly or collectively and in any order or relation and be connected to deck or stanchions to meet various different requirements.

What is claimed is:

1. Cargo tie-down safety hook, comprising a mounting shackle and a hook having a shank extending through the end of said shackle, said end of the shackle having an oversize opening for the shank permitting the hook to rock and pivot on the shackle, abutments on the hook shank at opposite sides of the end of the shackle, a guard for the end of the hook having a portion slidable over the shank between the end of the shackle and the abutment at the outer side of the shackle and a spring engaged on the shank between the end of the shackle and said portion of the guard exerting tension to hold the guard projected toward the end of the hook, said guard being a sheet metal plate having an opening in the end to pass over the end of the hook and having an oversize guide opening in the intermediate portion of the same receiving the shank of the hook at the outer side of the abutment.

2. Universal type variable cargo tie-down comprising a fixed length of webbing in the form of a loop having shackles in the opposite ends of said loop, a tie-down hook carried by one of said shackles for engagement with a cargo holding anchorage, a cross pin carried by the other one of said shackles, a variable length of webbing in the form of a loop engaged at one end about said cross pin, a free shackle engaged in the opposite end of said last mentioned loop of variable length webbing, an anchorage engaging hook carried by said last mentioned free shackle, a length adjusting take-up buckle securing the ends of said variable length loop of webbing together in length adjusted relation and arranged to be shifted to different longitudinal positions by shifting of said variable length loop over the aforementioned cross pin and an elongated cargo gripping and holding flexible strip underlying said connected fixed and variable length loops of webbing, said fixed length loop of webbing being fixedly secured to one end portion of said strip and the balance of said strip underlying said variable length loop of webbing being unattached to and free of said variable length webbing and whereby said variable length loop may be adjusted and tensioned over said strip without disturbing engagement of said strip with cargo held thereby.

References Cited in the file of this patent

UNITED STATES PATENTS

| | | |
|---|---|---|
| 869,382 | Newton | Oct. 29, 1907 |
| 1,093,945 | Ohlsson | Apr. 21, 1914 |
| 2,262,085 | Allen | Nov. 11, 1941 |
| 2,298,851 | Wachter | Oct. 13, 1942 |
| 2,353,017 | Denton | July 5, 1944 |
| 2,372,967 | Martin | Apr. 3, 1945 |
| 2,783,518 | Anderson | Mar. 5, 1957 |
| 2,791,817 | Burnham | May 14, 1957 |